(12) United States Patent
Baills

(10) Patent No.: US 7,914,730 B2
(45) Date of Patent: Mar. 29, 2011

(54) EQUIPMENT AND METHOD FOR HARDENING TREATMENT OF METALLIC PARTS

(75) Inventor: Jean-Michel Baills, Hericourt (FR)

(73) Assignee: Fives Celes, Hericourt (FR)

( * ) Notice: Subject to any disclaimer, the term of this patent is extended or adjusted under 35 U.S.C. 154(b) by 644 days.

(21) Appl. No.: 11/993,733

(22) PCT Filed: Jul. 1, 2005

(86) PCT No.: PCT/EP2005/009171
§ 371 (c)(1),
(2), (4) Date: Dec. 21, 2007

(87) PCT Pub. No.: WO2007/003222
PCT Pub. Date: Jan. 11, 2007

(65) Prior Publication Data
US 2009/0045556 A1 Feb. 19, 2009

(51) Int. Cl.
*F26B 13/10* (2006.01)
(52) U.S. Cl. .......................... 266/98; 266/103
(58) Field of Classification Search .......... 266/78, 266/98, 103; 219/10.57
See application file for complete search history.

(56) References Cited

U.S. PATENT DOCUMENTS

| | | | |
|---|---|---|---|
| 3,467,805 A | * | 9/1969 | Easley et al. ............ 219/639 |
| 3,738,636 A | | 6/1973 | Reinke et al. |
| 4,459,451 A | | 7/1984 | Regele |
| 6,160,247 A | | 12/2000 | Storm et al. |
| 6,555,800 B1 | | 4/2003 | Zahn |

FOREIGN PATENT DOCUMENTS

| | | |
|---|---|---|
| DE | 2205513 A1 | 8/1973 |
| DE | 3737694 C1 | 10/1988 |
| DE | 10141645 C1 | 4/2003 |
| GB | 2212174 A | 7/1989 |
| WO | 0063447 A2 | 10/2000 |
| WO | 0190426 A1 | 11/2001 |
| WO | 0236985 A2 | 5/2002 |

* cited by examiner

*Primary Examiner* — Scott Kastler
(74) *Attorney, Agent, or Firm* — Lesley S. Craig

(57) ABSTRACT

Equipment for metallic part hardening treatment comprising a support (10) and at least one working unit (50). The support is adapted to rotate the metallic part (20) during a hardening treatment. The working unit (50) comprises an inductor winding (51) to be positioned in front of a portion of said metallic part for heating said surface. According to the invention, the support (10) comprises one fixed spindle (11) to secure a first end (21) of the metallic part and one mobile tail stock (12) to contact a second end (22) of the metallic part. Therefore, only one end of the metallic part is secured whereas the other end is free to expand. The mechanical stresses applied to the metallic part during the hardening treatment are reduced and the distortion of the metallic part is prevented. Such equipment is well suited to crankshaft hardening treatment.

13 Claims, 2 Drawing Sheets

EQUIPMENT AND METHOD FOR HARDENING TREATMENT OF METALLIC PARTS

FIELD OF THE INVENTION

The present invention relates in general to method and equipment for inductively heating and quench hardening a metallic part, such as a crankshaft. More specifically, the present invention relates to inductively heating and quench hardening a crankshaft, wherein the crankshaft is let free to expand during the hardening treatment.

BACKGROUND OF THE INVENTION

As known per se, an automotive crankshaft is made up of a series of crankpins, one for each cylinder, in the case of in-line engines, or one for each pair of cylinders, in the case of V-type engines. The function of the crankshaft is to convert the reciprocating motion of the piston and its connecting rod into rotating motion. The throw of the crankshaft is equal to the stroke of the engine. The crankshaft needs to be properly balanced in order to eliminate centrifugal forces and accordingly the crankshaft is counterbalanced by weights placed opposite to the corresponding crankpins. Each pin is received within one end of a corresponding connecting rod whose opposite end is pinned to a piston. Crankshafts are also configured with axial bearing surfaces which are designed for receipt by the main bearings. A six cylinder in-line crankshaft would typically have seven main bearings.

Due to the load and wear on the crankpins and on the main bearing surfaces, the hardening of these portions of the crankshaft is important, in particular at the corner of said portions. Indeed, when an important load is applied to a metallic shape, the angular parts are usually first to break.

Equipment for crankshaft hardening treatment is already known. The surfaces to be harden are inductively heated by an inductor individually allocated to a surface and are quenched after heating. Conventional equipments usually comprise a support to secure both ends of the crankshaft. One or more gap gauge inductor windings are positioned in front of main bearing and/or crankpin surfaces to be hardened. The crankshaft is made to rotate and the inductors are made to heat the surfaces to which they are allocated. After a given time of heating, a refrigerant liquid is spread on the heated surface to quench it. For instance, water jet is pulsed through the inductor's casing. The inductor allocated to a crankpin has a cinematic to follow the crankpin's movement during rotation of the crankshaft.

Most equipment used in industry is specific to the crankshaft design to harden. For better yield, most equipment provides simultaneous heating of more than one bearing and crankpin at a time. Most equipment is configured for a given axel spread between main bearings and crankpins and must be reconfigured to be set for hardening a different designed crankshaft. Flexibility of known equipment is limited and this is a problem for application to the automobile industry.

It has been observed that the successive heating of surfaces of the crankshaft causes expansion of the metallic shape and the problem is that the crankshaft becomes distorted due to the respective locally limited exposure to heat.

WO-A-00 63447 describes a device for hardening crankshafts wherein at least two adjacent arranged surfaces to be hardened are simultaneously heated. The inductor that is individually allocated to one surface is operated with a frequency that differs from that of the inductor allocated to the immediate adjacent surface to be hardened. The aim of the method described in this document makes it possible to simultaneously harden closely adjacent surfaces while decreasing the risk of a defective hardening. However, this document doesn't deal with crankshaft distortion problems.

U.S. Pat. No. 6,160,247 and WO-A-01/90426 describe induction hardening apparatus and method in which the induction winding does not contact the surfaces of the crankshaft to reduce the stresses applied to the heated surface and limit the deformation of the crankshaft. However, those documents don't deal with crankshaft expansion caused by heating.

It has also been observed that the expansion of the crankshaft during the hardening treatment may induce an offset between the surface to be heated and the inductor winding position. This offset can cause a defective heating of the corners of the surface and weaken the crankshaft on those regions.

SUMMARY OF THE INVENTION

An objective of the present invention is to resolve the problems of the prior art and to propose flexible hardening equipment that prevent the crankshaft distortion during the hardening treatment. Another objective of the invention is to enhance the hardening treatment by accurately heating the different portions of the crankshaft, in particular at the corner of the main bearings and crankpins.

To this end, the present invention proposes hardening equipment that allows a metallic part, such as a crankshaft, to expand fore and aft during the heating to prevent any twist that could cause distortion. The equipment of the invention also proposes to measure the crankshaft expansion to control the inductor's positioning precisely in front of the surfaces to be heated.

More specifically, the invention proposes equipment for metallic part hardening treatment comprising a support and at least one working unit. The support is adapted to rotate the metallic part during a hardening treatment, so the entire periphery of the surface can be heated. The working unit comprises an inductor winding to be positioned in front of a portion of said metallic part for heating said surface, such as a main bearing or a crankpin of a crankshaft. According to the invention, the support comprises one fixed spindle to secure a first end of the metallic part and one mobile tail stock to contact a second end of the metallic part.

Therefore, only one end of the crankshaft is secured whereas the other end is free to expand. The mechanical stresses applied to the crankshaft during the hardening treatment are reduced and the distortion of the crankshaft is prevented.

According to another aspect of the invention, the equipment may include a detector measuring the metallic part expansion during the hardening treatment, advantageously by measuring the translation of the mobile tail stock caused by the metallic part expansion. This measurement can be used by a control unit to adjust the position of the inductor precisely in front of the surface to be heated and make sure the corners of surfaces are properly heated during treatment.

The equipment of the invention provides accurate heating of the surfaces to be hardened and prevents the distortion of crankshaft. Moreover, driving the inductor position to face accurately the surface to be heated provides flexibility to use the equipment for any crankshaft whatever the axel spread between the main bearings and crankpins is. This flexibility allows a better work output with given equipment and reduces the cost of the manufactured pieces.

The invention also proposes method for hardening a metallic part comprising the steps of:
- loading a metallic part on a support of a hardening equipment by securing a first extremity of the metallic part to a fixed spindle and positioning a second extremity of the metallic part to rest in contact with a mobile tail stock;
- positioning at least one inductor winding in front of a portion of said metallic part, such as a main bearing or a crankpin of a crankshaft;
- operating a hardening treatment on said metallic part.

According to an aspect of the invention, the method further comprises the steps of:
- measuring the metallic part expansion during the hardening treatment;
- controlling the position of the inductor winding along the metallic part depending on said measurement.

BRIEF DESCRIPTION OF THE DRAWINGS

The special features and advantages of the present invention will become apparent during the description which follows, given by way of illustration and non-limitatively, and with reference to the figures in which.

DESCRIPTION OF THE PREFERRED EMBODIMENT

For purpose of clarity, cartesian coordinates (X, Y, Z) are defined; X-axis and Y-axis lay horizontal and Z-axis lays vertical. Those directions are illustrative and not limitative of the invention.

The equipment is described hereafter in detailed with reference to a crankshaft hardening treatment. However, it must be noted that any type of metallic part, other than a crankshaft, can be hardened using equipment of the invention, such as a camshaft for instance.

Figure 1:
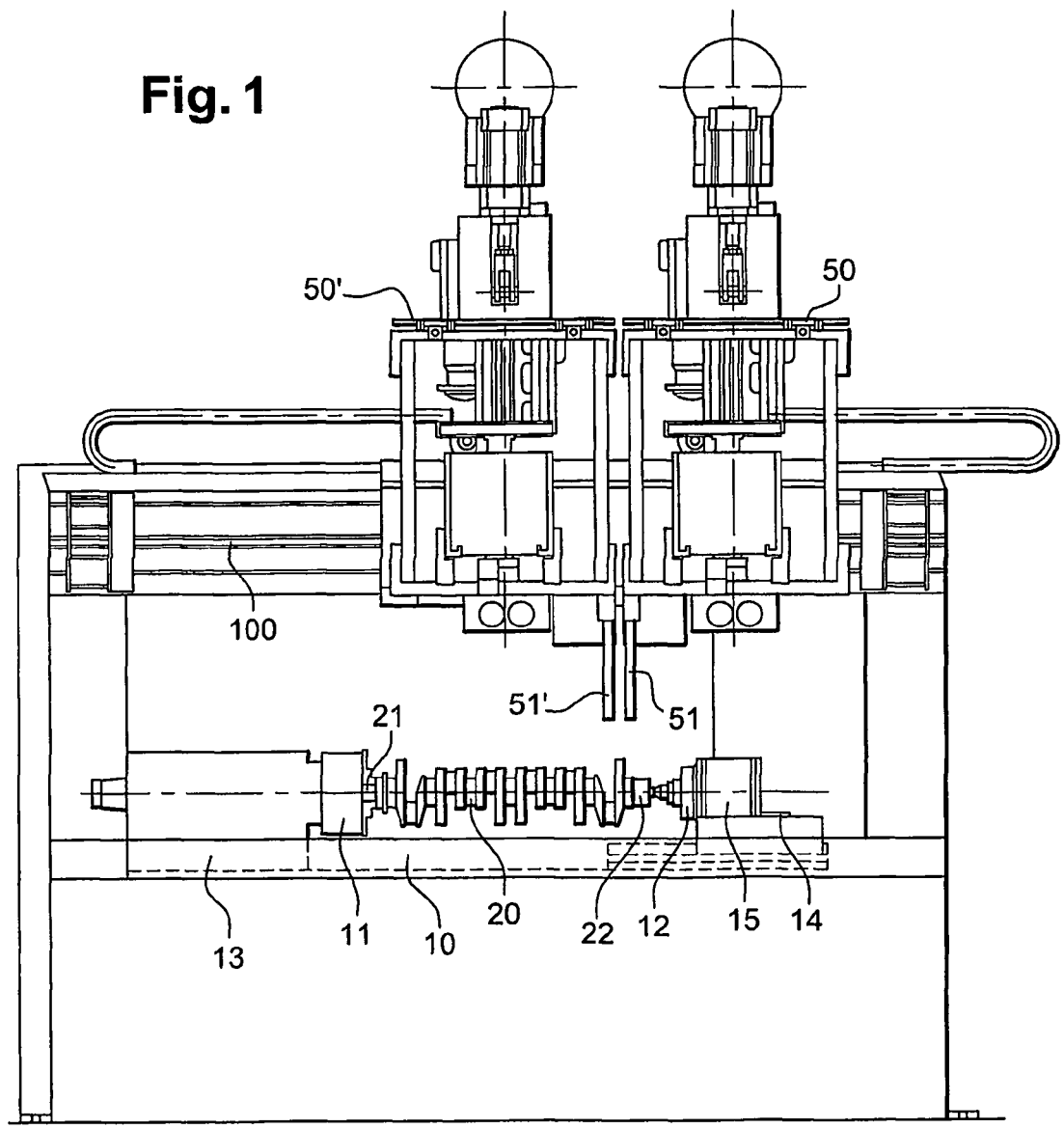
FIG. 1 is a front view of the equipment according to an embodiment of the invention.

As illustrated in FIG. 1, the equipment of the invention comprises a crankshaft support 10 having one fixed spindle 11 and one mobile tail stock 12. A crankshaft 20 is shown on said support 10, lying horizontal along the defined X-axis. A first end 21 of the crankshaft is secured to the fixed spindle 11 and the second end 22 of the crankshaft is laid on the mobile tail stock 12. For instance, the mobile tail stock comprises a conical tip inserted in a conical recess provided at the end 22 of the crankshaft in order to maintain the axle of the crankshaft substantially horizontal during the hardening treatment.

The fixed spindle 11 is driven by motor 13 to rotate the crankshaft during treatment. Advantageously, motor 13 is a digital motor to handle indexation of the crankshaft. The crankshaft 20 is secured to the fixed spindle 11 and driven by said spindle, but the crankshaft is only contacting the mobile tail stock 12, i.e. both ends of the crankshaft are not hold into fixed position and the crankshaft can therefore expand without risk of deformation.

The mobile tail stock 12 is associated with spring 14 and detector 15. According to a possible embodiment, the spring 14 forces the tail stock 12 against the crankshaft 20 and is stressed by the tail stock being pushed by crankshaft expansion during heating. The detector 15 measures the spring stroke and provides a value representative of the tail stock translation. As explained above, the tail stock translation is due to crankshaft expansion during heating treatment FIG. 1 also shows two working units 50, 50' comprising each an inductor winding 51, 51'. In the illustrated embodiment, one inductor 51 is to be positioned in front of a main bearing and one inductor 51' is to be positioned in front of a crankpin of the crankshaft 20. Each working unit comprises a carriage that translates horizontally along a portal frame 100 and a vertical sliding structure receiving the inductor winding. The working unit will be described in more details with reference to FIG. 2.

The equipment also comprises a control unit for controlling various parameters of the hardening treatment, i.e. positioning of working unit along the X-axis of the portal frame to set working unit in front of a surface to harden and positioning of vertical sliding structure along the Z-axis to bring the inductor close to the surface to harden, as well as time cycles for treatment operation such as heating, resting and quenching with inductor winding.

According to the invention, the control unit also controls the position of inductor winding along the crankshaft axis (X-axis) during the hardening treatment depending on the detector 15 measurement. Therefore, in addition to the working unit being positioned to set an inductor winding in front of a surface to harden, the working unit is also repositioned during the hardening treatment to compensate the crankshaft expansion. With equipment of the invention, it is therefore possible to keep the inductor winding accurately positioned in the middle of a main bearing or crankpin in order to fully heat and quench the whole surface of the main bearing and crankpin, especially the corners thereof. In particular, when more than one working unit is used in order to harden more than one main bearing or crankpin at a time, the control unit of equipment according to the invention controls the position of each inductor winding independently from each other. This independent positioning control of the inductors also provides maximum flexibility to the equipment according to the invention because it exempts the relative position of inductors 51, 51' from axle spread between main bearings and crankpins. The equipment of the invention can therefore be used with any crankshaft design without any change of structure.

Figure 2:
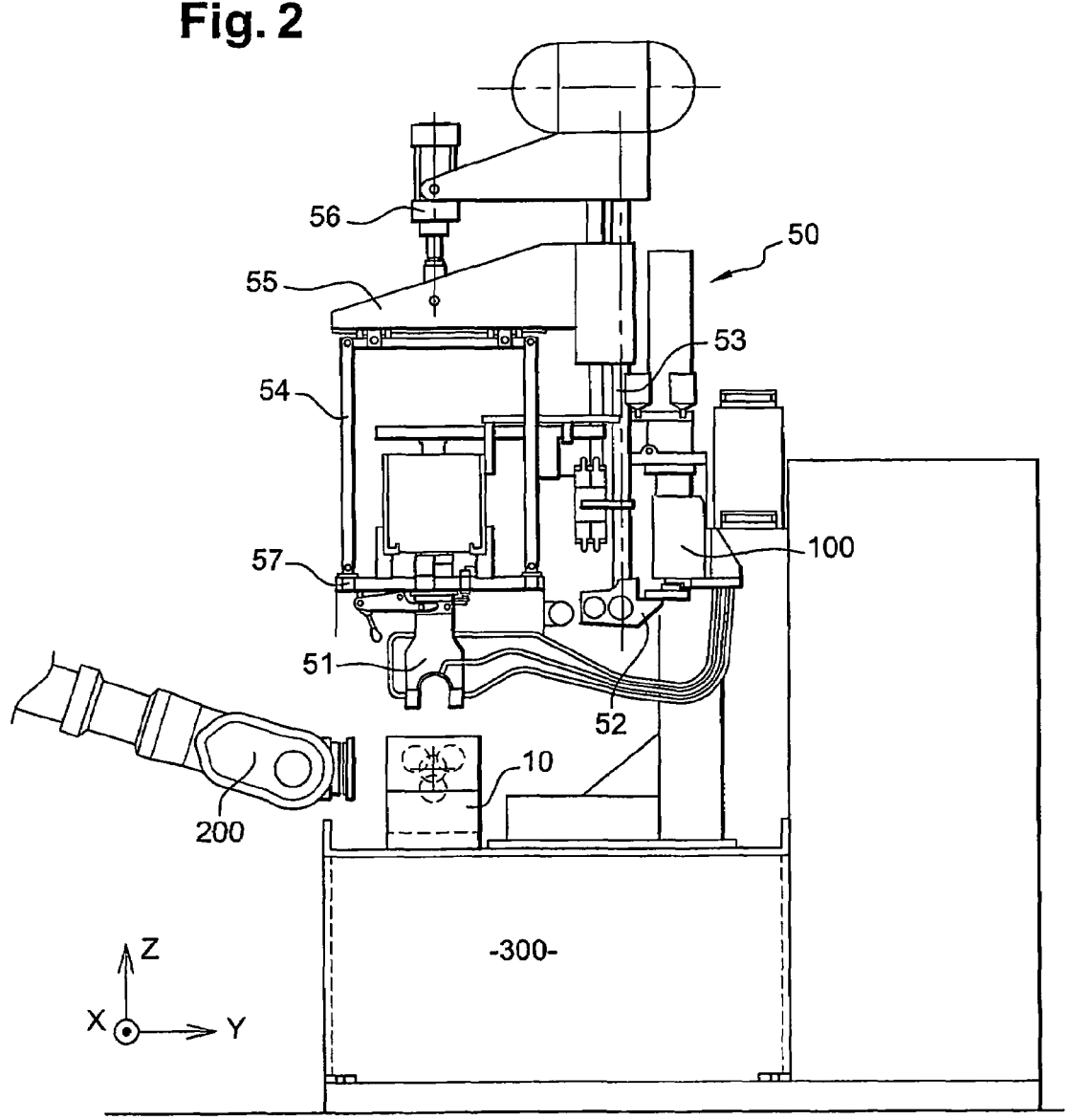
FIG. 2 is a lateral view of the equipment of FIG. 1.

FIG. 2 illustrates with more details one working unit 50 for use in the equipment of the invention. Each working unit comprises a carriage 52 that translates horizontally along a portal frame and a vertical sliding structure 54 receiving the inductor winding 51. The working unit 50 is made to move the inductor 51 in three dimensions (X, Y, Z) during the hardening treatment; a first moving dimension (X) is handled by carriage 52 to adjust position of the working unit 50 in front of the surface under treatment and two dimensions (Y, Z) are handled by the sliding structure 54 to follow the circular crankpin movement during treatment.

The repositioning along the X-axis was described above. Carriage 52 is driven by control unit along the portal frame 100 to remain in accurate position with the surface under treatment.

The circular movement—along the Y-axis and Z-axis—of the inductor 51 to follow a crankpin under treatment is operated by the sliding structure 54. It should be noted that any other structure than the one illustrated on FIG. 2 can be used for making a sliding arm that induces a circular movement of the inductor winding.

On FIG. 2, inductor 51 is hanged to a parallelepiped structure 54 connected to a sliding nut 55 adapted to translate on a vertical sliding arm 53 secured to the carriage 52. The vertical sliding arm 53 is motorised to drive the sliding nut 55 and the parallelepiped structure 54 down for installation of the inductor 51 in front of the surface to be treated. When the inductor is positioned, the sliding arm 53 is locked in position and the sliding nut 55 will be let free to translate along the arm 53 to drive the structure 54 and the inductor 51 up and down during the hardening treatment, as fully described bellow.

When the inductor is positioned on a main bearing, it remains still during the rotation of the crankshaft for performing the hardening treatment. When the inductor is positioned on a crankpin or on any other off-center portion of a shaft, it must follow the planar circular movement of the crankpin induced by the rotation of the crankshaft.

The parallelepiped structure 54 is made to allow circular movement of the inductor; the corners 57 of the structure 54 are pivot joints that allow the structure to transform from a rectangle to a rhomb.

In the embodiment of FIG. 2, the inductor 51 is resting on the surface to heat. Therefore, the rotation of the crankshaft can drive the inductor's movement. A plunger cylinder 56, such as a lever-activated gaz cylinder, is connected to the sliding nut 55 to accompany the sliding movement along the arm 53 when the parallelepiped structure 54 and inductor 51 are moving up and down during the hardening treatment. Pressure injected in the cylinder 56 is balanced to minimize the weight of the nut 55, structure 54 and inductor 51 when the crankpin is moving upwards. The balanced plunger cylinder 56 limits the mechanical stresses applied to the crankshaft during the hardening treatment and helps to reduce the defective hardening.

The inductor 51 is hanged on the lower side of the structure 54. When the crankpin goes down (−Z), the inductor follows by its own weight and brings the sliding nut 55 down the Z-axis along the sliding arm 53; when the crankpin goes up (+Z), the inductor is pushed and the nut 55 slides upward along the sliding arm 53, the nut 55 being supported by the plunger cylinder 56 in its upward movement. When the crankpin goes front (−Y), the parallelepiped structure 54 deforms around the pivot joints 57 to shift its lower side frontward; when the crankpin goes back (Y), the parallelepiped structure 54 deforms around the pivot joints 57 to shift its lower side backward.

According to another possible embodiment, the inductor winding can be received on orbital structure driving the inductor contact less with the crankshaft. For instance, the inductor can be hanged to parallelepiped structure or arm making a circular movement calculated by control unit. Therefore, the inductor doesn't rest on the heated surface but follows to crankpin movement by trajectory calculation. This allows reducing even more the stresses applied to the crankshaft during the hardening treatment.

The equipment of the invention operates as follow.

A crankshaft 20 is loaded on a support 10 of hardening equipment such as the equipment described above. The crankshaft 20 was previously cleaned to get rid of oil particles and is brought by automatic grip 200 controlled by control unit. A first end 21 of the crankshaft is secured to a fixed spindle 11 and the second end 22 of the crankshaft is positioned to rest in contact with a mobile tail stock 12. The angular position of the crankshaft 20 is indexed when the first end 21 is secured to the fixed spindle 11. At least one inductor winding 51 is then positioned in front of a main bearing or a crankpin of said crankshaft 20. For instance, carriages of working units as illustrated in FIG. 1 are moved along a portal frame 100 to come in front of a main bearing and a crankpin to harden simultaneously. Sliding structures are then activated to bring the inductor windings close to the surfaces to harden, either in contact or contact less with said surfaces as explained before.

The hardening treatment of said surfaces is then operated. The inductor 51 is made to heat the surface while the crankshaft 20 is rotating to distribute heat over the whole surface to harden. Conventional cycle for hardening treatment is a few seconds heating the surface, a few seconds plateau and quenching the surface by spreading refrigerant liquid on the heated surface. In FIG. 2, refrigerant liquid is spread through the inductor casing. A liquid catch trough 300 is provided below the crankshaft support 10.

The hardening treatment is repeated for each surface to harden; if the equipment has two working units, a main bearing and a crankpin can be treated simultaneously and operating time on one crankshaft is reduced.

According to the invention, during the hardening treatment, the second end 22 of the crankshaft 20 is let free to expand against the mobile tail stock 12. Distortion of the crankshaft is prevented. Moreover, the crankshaft expansion can be measured during the hardening treatment, for instance by measuring the mobile tail stock translation using a spring and a position detector as described above. The position of each inductor winding along the crankshaft axis can therefore be controlled by a control unit driving the carriage to compensate for the crankshaft expansion depending on the measured tail stock translation. Accurate positioning of each inductor is achieved and heat distribution over the surface to harden is managed to cover the surface corners.

The invention is not limited to the embodiments described by way of example with reference to the figures; in particular, the arrangement of the crankshaft support and the working units can be modified within the scope of the invention. Moreover, any type of conventional inductor winding can be used for performing the hardening treatment with the equipment of the invention. Furthermore, any other metallic shaft can be treated with the equipment of the invention, other than a crankshaft.

The invention claimed is:

1. An equipment for metallic part hardening treatment comprising a support adapted to rotate the metallic part during a hardening treatment and at least one working unit comprising an inductor winding to be positioned in front of a portion of said metallic part, wherein the support comprises one fixed spindle to secure a first end of the metallic part and one mobile, tail stock to contact a second end of the metallic part, wherein the equipment further comprises a detector measuring a translation of the mobile tail stock during the hardening treatment, and a control unit controlling the position of the at least one inductor winding along the metallic part depending on the position detector measurement.

2. The hardening equipment of claim 1, wherein the working unit is adapted to move the inductor winding in three dimensions during the hardening treatment.

3. The hardening equipment of claim 1, wherein the working unit translates depending on the position detector measurement during the hardening treatment.

4. The hardening equipment of claim 1, wherein the inductor winding is resting on a portion of the metallic part during the hardening treatment.

5. The hardening equipment of claim 4, wherein the inductor winding is positioned on a structure balanced by a plunger cylinder to limit the stresses on the metallic part during the hardening treatment.

6. The hardening equipment of claim 1, wherein the inductor winding is contact less with a portion of the metallic part during the hardening treatment, a control unit driving the inductor's movement to remain in phase with an off-centre portion during rotation of the metallic part.

7. The hardening equipment of claim 1, comprising at least two working units, wherein the control unit controls the position of each inductor winding along the metallic part independently from each other.

8. The hardening equipment of claim 1, wherein the metallic part is a crankshaft comprising main bearing and crankpin portions to be hardened.

9. The hardening equipment of claim 8, comprising at least two working units, each having one inductor positioned respectively in front of one or two main bearings and/or in front of one or two crankpins during the hardening treatment.

10. A method for hardening a metallic part comprising the steps of:
    loading a metallic part on a support of hardening equipment by securing a first end of the metallic part to a fixed spindle and positioning a second end of the metallic part to rest in contact with a mobile tail stock;
    positioning at least one inductor winding in front of a portion of said metallic part;
    operating a hardening treatment on said metallic part;
    measuring the metallic part expansion during the hardening treatment; and
    controlling the position of the inductor winding along the metallic part depending on said measurement.

11. The method of claim 10, wherein the step of measuring the metallic part expansion comprises measuring the translation of the mobile tail stock.

12. The method of claim 10, wherein the step of controlling the position of the inductor winding comprises controlling the translation of a working unit supporting the inductor winding.

13. The method of claim 10, wherein the metallic part is loaded on a support of the hardening equipment, the hardening equipment comprising a support adapted to rotate the metallic part during a hardening treatment and at least one working unit comprising an inductor winding to be positioned in front of a portion of said metallic part, wherein the support comprises one fixed spindle to secure a first end of the metallic part and one mobile, tail stock to contact a second end of the metallic part.

* * * * *

UNITED STATES PATENT AND TRADEMARK OFFICE
CERTIFICATE OF CORRECTION

PATENT NO.         : 7,914,730 B2
APPLICATION NO.    : 11/993733
DATED              : March 29, 2011
INVENTOR(S)        : Baills It is certified that error appears in the above-identified patent and that said Letters Patent is hereby corrected as shown below:

On the title page
    In Item (73) on the face of the above-identified patent, please remove the assignee Fives Celes of Hericourt, France and add the assignees Five Celes of Lautenbach, France and Cinetic Automation of Hericourt, France.

Signed and Sealed this
Fourteenth Day of February, 2012

David J. Kappos
*Director of the United States Patent and Trademark Office*